United States Patent [19]
Blasbalg

[11] Patent Number: 4,771,391
[45] Date of Patent: Sep. 13, 1988

[54] ADAPTIVE PACKET LENGTH TRAFFIC CONTROL IN A LOCAL AREA NETWORK

[75] Inventor: Herman Blasbalg, Gaithersburg, Md.

[73] Assignee: International Business Machines Corporation, Armonk, N.Y.

[21] Appl. No.: 887,477

[22] Filed: Jul. 21, 1986

[51] Int. Cl.[4] .................................. H04J 3/02
[52] U.S. Cl. .................................. 364/514; 364/200; 370/85; 370/94; 340/825.5
[58] Field of Search ............... 364/514, 200, 900, ; 370/91–94, 85; 340/825.5

[56] References Cited

U.S. PATENT DOCUMENTS

| | | | |
|---|---|---|---|
| 3,804,990 | 4/1974 | Costa et al. | 179/15 AS |
| 3,811,014 | 5/1974 | Seitz | 179/15 BW |
| 3,876,838 | 4/1975 | Boxall | 179/15 BW |
| 4,100,377 | 7/1978 | Flanagan | 179/15 AS |
| 4,251,880 | 2/1981 | Baugh et al. | 370/80 |
| 4,398,289 | 8/1983 | Schoute | 370/93 |
| 4,412,326 | 10/1983 | Limb | 370/92 |
| 4,441,162 | 4/1984 | Lillie | 370/92 |
| 4,453,247 | 6/1984 | Suzuki et al. | 370/94 |
| 4,454,508 | 6/1984 | Grow | 340/825.05 |
| 4,491,947 | 1/1985 | Frank | 370/94 |
| 4,516,239 | 5/1985 | Maxemchuk | 370/94 |
| 4,581,734 | 4/1986 | Olson et al. | 370/94 |
| 4,583,088 | 4/1986 | Bux et al. | 370/93 |
| 4,623,886 | 11/1986 | Livingston | 370/94 |
| 4,638,477 | 1/1987 | Okada et al. | 370/94 |

FOREIGN PATENT DOCUMENTS 59-085159  5/1984  Japan ................................ 364/514

OTHER PUBLICATIONS

J. E. Gaffney, Jr., "Adaptive Communication Channel Control, IBM TDB, Apr. 1979, pp. 4604–4605.

S. A. Townes, et al., "Performance of an ADPCM/TASI System," 1980 Intl. Conference on Communications, Jun. 1980, pp. 42.6.1–5.

Alcide Molinari, et al., "Bit Rate Per Channel Halving in PCM . . . , IEEE Transactions on Communications, vol. COM-26, May 1978, pp. 638–646.

F. A. Tobagi, et al., "Packet Switching in Radio Channels: Part IV . . . IEEE Transactions on Communications, vol. COM-25, pp. 1400–1416,12/75.

S. S. Lam, "Carrier Sense Multiple Access Protocol for Local Networks Computer Networks, vol. 4, pp. 21–32, Jan.-Feb., 1980.

F. Tobagi, et al., "Performance Analysis of Carrier Sense Multiple . . . Computer Networks, vol. 4, pp. 245–259, Oct.-Nov. 1980.

I. Rubin, "Synchronous and Carrier Sense Asynchronous . . .", IEEE Transactions on Communications, vol. COM-31, pp. 1063–1077, 9/83.

J. S. Meditch, et al., "Stability and Optimization of the CSMA . . . " IEEE Transactions on Communications, vol. COM-31, pp. 763–774, 6/83.

W. Bux, "Performance Issues in Local Area Networks," IBM Systems Journal, vol. 23, No. 4, 1984.

M. J. Ferguson, et al., "Exact Results for Nonsymmetric Token . . ." IEEE Transactions on Communications, vol. COM-33, No. 3, Mar. 1985.

W. Bux, "Local-Area Subnetworks; A Performance Comparison," IEEE Transactions on Communications, vol. COM-9, No. 10, 10/81.

*Primary Examiner*—P. S. Lall
*Assistant Examiner*—Brian M. Mattson
*Attorney, Agent, or Firm*—John E. Hoel

[57] ABSTRACT

A distributed control apparatus and method is disclosed to maintain the network stability in a packet switching local area network under changing traffic load conditions, by controlling the size of the packets transmitted by each node. The invention monitors the present information flow rate in the network and computes an average packet length which it then uses to adjust the size of the variable length data field in each message frame. In this manner, network flow control can be achieved without forcing data terminals connected to the nodes of the network to adjust their speed. The invention is applicable to a wide variety of local area network protocols for both ring and bus architectures.

10 Claims, 8 Drawing Sheets

FIG. 1.
LOCAL AREA NETWORK

FIG. 2.
PERFORMANCE TRACKING CHARACTERISTICS

FIG. 3.
OVERALL FRAME FORMAT FOR TOKEN RING

FIG. 4.
NODE ARCHITECTURE

*FIG. 5.*
FLOW DIAGRAM OF PAC OPERATION

FIG. 7.
PERFORMANCE ADAPTIVE CONTROL (PAC) SYSTEM FOR LANS

FIG. 8.

TRACKING CHARACTERISTIC FOR NON-HOMOGENOUS TRAFFIC

FIG. 9.

PERFORMANCE ADAPTIVE CONTROL (PAC) ADAPTOR CARD FUNCTIONS

FIG. 10.
PAC WORK STATION ARCHITECTURE

ADAPTIVE PACKET LENGTH TRAFFIC CONTROL IN A LOCAL AREA NETWORK

BACKGROUND OF THE INVENTION

1. Technical Field

The invention disclosed broadly relates to data processing and data communications and more particularly relates to techniques for maintaining data throughput in a packet switching local area network under changing traffic load.

2. Background Art

Local area networks are communications systems for transferring data among a plurality of workstation terminals, peripheral devices, cluster controllers, or host systems within the bounds of a single office building or building complex. A node refers to any machine or combination of machines which attaches to and uses the local area network. Local area network architectures allow for the attachment of many nodes to a common physical link. The shared access link permits any node to communicate directly with any other node attached to the link through the propagation of electrical signals and the logical connections established by link protocols. Data is transferred as packets consisting of a variable-length information field preceded by appropriate addressing fields. Two general types of physical link topologies are used for shared access links, the ring and the bus. A ring consists of a series of nodes which are connected by unidirectional transmission links to form a single closed path. Information signals on the ring pass from node to node and are regenerated as they pass through each node. The bus type of link provides a bidirectional transmission facility to which all nodes are attached. Information signals propagate away from the originating node in both directions to the terminated ends of the bus.

The topology of a ring or a bus shared access link permits simultaneous access to the medium by all attached nodes. Thus it is possible for two or more nodes to attempt transmission at the same time resulting in interference between the signals. Both physical and logical control mechanisms are employed to resolve the contention for access. Time division multiplexing separates the energy of the two signals into different periods of time. The time division multiplexing (TDM) of digital information can be synchronous TDM or asynchronous TDM. Synchronous TDM allows each node to use a portion of the bandwidth for the medium at periodic intervals. Asynchronous TDM allows each node to transmit for a variable length of time. The data is blocked into packets that contain appropriate addressing information for routing the data. A logical control mechanism must be employed in conjunction with asynchronous TDM to regulate each node's access to the link for transmission.

For a bus topology, one access control mechanism is called the carrier sense multiple access with collision (CSMA/CD). This access method is described in the *IEEE Standard* 802.3, *CSMA/CD Access Method and Physical Layer Specifications*. Prior to initiating transmission, a node senses whether a carrier signal is present since this indicates that another node is transmitting. The origination of a new transmission will be delayed by the node until the carrier signal is removed. Once the node's transmission is started, it continues to monitor the transmission for a collision, that is the destruction of the transmitted electrical signals indicating the presence of another transmitting node. In the event of a collision, transmission is halted and the node either waits a random period of time before attempting to retransmit, or waits for a predetermined time interval.

An example access method for transmission of packets on a ring topology is the token ring multiple access (TRMA) method. In this distributed control access method, a unique sequence, called a token, is passed from one node to another. The receipt by a node of the token gives it permission to initiate a transmission. Upon the completion of the transmission, the token is passed to another node. For a ring, this token is passed implicitly, that is without addressing information, to the next node on the ring. In a bus topology, an explicit token which contains specific node address information is employed. The explicit token approach creates an ordering of the nodes which can be described as a logical ring. Token ring characteristics are specified in IEEE Project 802 Local Area Network Standards, *Draft IEEE Standard* 802.5, *Token Ring Access Method and Physical Layer Specifications*, working draft (February 1984). Additional references providing a background on token ring local area networks include an article by N. C. Strole entitled "A Local Communications Network Based on Interconnected Token Access Rings: A Tutorial," *IBM Journal of Research and Development,* Vol. 27, No. 5, September 1983, pp. 481–496, an article by R. C. Dixon, et al. entitled "A Token Ring Network for Local Data Communications," *IBM Systems Journal,* Vol. 22, Nos. 1–2, 1983, pp. 47–62.

A problem shared by all multiple access packet switching local area networks is that the time which must be devoted to resolving the contentions for access by the nodes becomes an increasing function of the network loading. The network loading can be characterized by the duty factor $\rho$, otherwise known as the bandwidth utilization efficiency which is the ratio of the present information flow rate R (in bits per second) divided by the maximum capacity information flow rate Ro (in bits per second). As the information flow rate or the duty factor increases, the packet delay time T, which is the average waiting time for a node to obtain access to the communications medium and to successfully transmit the packet, increases. Although the relationship between the reduction in performance and the increase in network loading varies among the various types of access methods, all access methods for packet transmission on a multiple access communications link suffer this degraded operating characteristic. If the overloading condition continues to increase, the network becomes unstable with many nodes being unable to obtain any access to the communications medium for long periods of time.

Attempts have been made in the prior art to provide an adaptive control method to reduced the instability resulting from network loading. The following references disclose adaptive control procedures for CSMA/CD access method, where the random waiting time for retransmission is changed as a function of network load.

1. F. A. Tobagi and L. Kleinrock, "Packet Switching in Radio Channels: Part IV, Stability Considerations and Dynamic Control in Carrier Sense Multiple Access," *IEEE Transactions on Communications,* Vol. COM-25, pp. 1400–1416, December 1975.

2. S. S. Lam, "A Carrier Sense Multiple Access Protocol for Local Networks," *Computer Networks*, Vol. 4, pp. 21-32, January-February, 1980.

3. F. Tobagi and V. Hunt, "Performance Analysis of Carrier Sense Multiple Access with Collision Detection," *Computer Networks*, Vol. 4, pp. 245-259, October-November 1980.

4. I. Rubin, "Synchronous and Carrier Sense Asynchronous Dynamic Group Random Access Schemes for Multiple Access Communications," *IEEE Transactions on Communications*, Vol. COM-31, pp. 1063-1077, September 1983.

5. J. S. Meditch and C. T. A. Lea, "Stability and Optimization of the CSMA and CSMA/CD Channels," *IEEE Transactions on Communications*, Vol. COM-31, pp. 763-774, June 1983.

Other discussions of performance characteristics for local area networks can be found in:

6. W. Bux, "Performance Issues in Local Area Networks," *IBM Systems Journal*, Vol. 23, No. 4, 1984.

7. Michael J. Firguson, and Yehuda J. Aminetzah, "Exact Results for Nonsymmetric Token Ring Systems," *IEEE Transactions on Communications*, Vol. COM-33, No. 3, March 1985.

8. W. Bux, "Local—Area Subnetworks; A Performance Comparison," *IEEE Transactions on Communications*, Vol. COM-9, No. 10, October 1981.

The problem with this approach is that there is no attempt to maintain a network traffic at a fixed value since the effect of this prior art technique is to either drop or reduce the traffic at some nodes while accommodating the traffic at other nodes in order to maintain network stability. This substantially reduces the overall data throughput for the network since data flow control signals must be passed back to the sources of the information to be transmitted signaling them to reduce their rate of delivery of information to be transmitted on the local area network.

OBJECTS OF THE INVENTION

It is therefore an object of the invention to provide an improved technique for reducing the effects of overloading on a local area network.

It is another object of the invention to maintain the traffic level at all nodes in a local area network when the overall level of network traffic increases.

It is yet a further object of the invention to provide an improved technique for reducing the effects of network overloading in a local area network, which is independent of the nature of the traffic, being either interactive data, data file transfers, digitized voice, or other types of digital information.

It is yet a further object of the invention to maintain network stability in a packet switching local area network under changing traffic load in an optimal manner.

It is still a further object of the invention to provide an improved technique for reducing the effects of overloading on a local area network, which is independent of the access method or communications protocol.

It is yet a further object of the invention to provide an improved technique for reducing the effects of network overloading on a local area network without using flow control to reduce the delivery of data from information sources connected to the network.

SUMMARY OF THE INVENTION

These and other objects, features and advantages of the invention are accomplished by the adaptive packet length traffic control method and apparatus disclosed herein. The invention finds application in a local area communications network having a plurality of nodes connected to a multiple access communications medium. Each node will execute an access method to obtain exclusive access to the medium after which the node gaining access will transmit a packet of information over the medium. The invention is an adaptive packet length apparatus and its method of operation, which can be distributed in each of the nodes or, alternately, which can be a centralized control. The adaptive packet length apparatus and method minimizes the average delay for each node gaining access to the medium.

The adaptive packet length apparatus includes a storage means in the form of a writable random access memory and/or a read only memory for storing program instructions representing the functional relationship between the packet length for the packets and the information flow rate in the medium. The form of the functional relationship stored in the storage means can be either an arithmetic expression relating the packet length and the information flow rate or, alternately, it can be a table of corresponding values relating the packet length to the information flow rate. The functional relationship relates those packet lengths and corresponding information flow rates which correspond to the minimum value of the average delay for a node to gain access to the medium.

The adaptive packet length apparatus further includes a measurement means which is coupled to the communications medium for measuring the average information flow rate in the medium. A buffer means is included at each node coupled to a source of information to be transmitted and also coupled to the communications medium. The buffer means temporarily stores a block of the information from the source prior to the transmission over the medium.

The adaptive packet length apparatus further includes a computing means which is connected to the storage means, the measurement means and the buffer means. The computing means receives the measured value of the average information flow rate from the measurement means. The computing means then executes the program instructions from the storage means to operate on the measured value and to compute a resultant package length value. The computing means then accesses a sub-block of the block of information in the buffer means, having a length approximately equal to the resultant packet length value calculated by the computing means. The buffer means then outputs the accessed sub-block of information for transmission over the medium. The resultant length of the packet of information transmitted is adaptively controlled by the invention in response to the measured present information flow rate in the medium.

The operation of the invention results in increasing the packet length in response to measured increases in the information flow rate in the medium in order to minimize the average delay for a node to gain access to the medium. The increased length in the packets of information produced by the invention enables greater attention to be focused on actual transmission of information by a node and correspondingly less attention to be dissipated on the contention resolution process for gaining access by the node to the medium. When performed under increasing load conditions, the operation of the invention results in an increased throughput and a maintenance of network stability. Increasing the length of the packets does not substantially reduce the overall information throughput for the network. The operation of the invention is independent of the local area network protocol.

The method of operation of the invention is to impose the relationship that the average length of the packets on the network is to be a function of the measured information flow rate on the network, those packet lengths corresponding to the minimum value of the average delay for a node gaining access to the network. By adaptively controlling the packet lengths in accordance with this functional relationship, information throughput and network stability are maintained in the face of increasing loading conditions. The method of operation of the invention includes the steps of storing the relationship between the packet length and the flow rate prior to the communications session. Then, during the communications session, the present average flow rate is measured for the medium. When information is to be transmitted by a node, a buffer at the node stores a block of the information to be transmitted. Then the functional relationship between the packet length and the flow rate is used to compute the present packet length by operating on the measured value of the flow rate. Then a sub-block of information of the computed packet length is accessed from the buffered block of information and is transmitted over the medium from the node. The operations of accessing additional sub-blocks and transmitting those sub-blocks is repeated until all of the information desired to be transmitted by the node, has been so transmitted. This method can be carried out in a distributed manner at each of the respective nodes in the local area network or, alternately, it may be carried out at a centralized location with control signals being transmitted to the respective nodes to carry out the respective transmitting operations.

BRIEF DESCRIPTION OF THE DRAWINGS

The foregoing and other advantages of the invention will be more fully understood with reference to the description of the best mode and the drawing wherein.

DESCRIPTION OF THE BEST MODE FOR CARRYING OUT THE INVENTION

The invention will be described in conjunction with an example token ring multiple access local area network shown in FIG. 1. However, the invention is applicable to a wide variety of local area networks including both bus topologies as well as ring topologies and is not limited to a particular access method or protocol as long as the performance characteristics for the network conform to the "cusp" behavior shown in the performance diagrams of FIG. 2. FIG. 2 is a graph which relates the packet length (Lp) to the flow rate (R) for minimum access delay times T over a range of network loading values. The ordinate for the graph of FIG. 2 is the ratio of the access delay time or packet delay T divided by the propagation delay over the total length of the ring or cable. The abscissa of the graph of FIG. 2 is the product of the maximum capacity information flow rate Ro times the total signal propagation time over the length of the ring and divided by the packet length Lp. Separate curves are drawn for four different duty factors (duty factor being the ratio of the present information flow rate R divided by the maximum capacity information flow rate Ro). The several values for the duty factor $p$ range from 0.5 through 0.8 in FIG. 2. It is seen that for each curve having a constant value duty factor, there is a minimum value for the access delay time T which corresponds to a value for the packet length Lp. This "cusp" shaped curve is the network characteristic which must necessarily be manifested in order for a network to be amenable to the operation of the invention. Token ring multiple access networks, carrier sense multiple access with collision detection networks, and many other network access protocols conform to this characteristic and are therefore applications for the operation of the invention disclosed herein.

Figure 1:
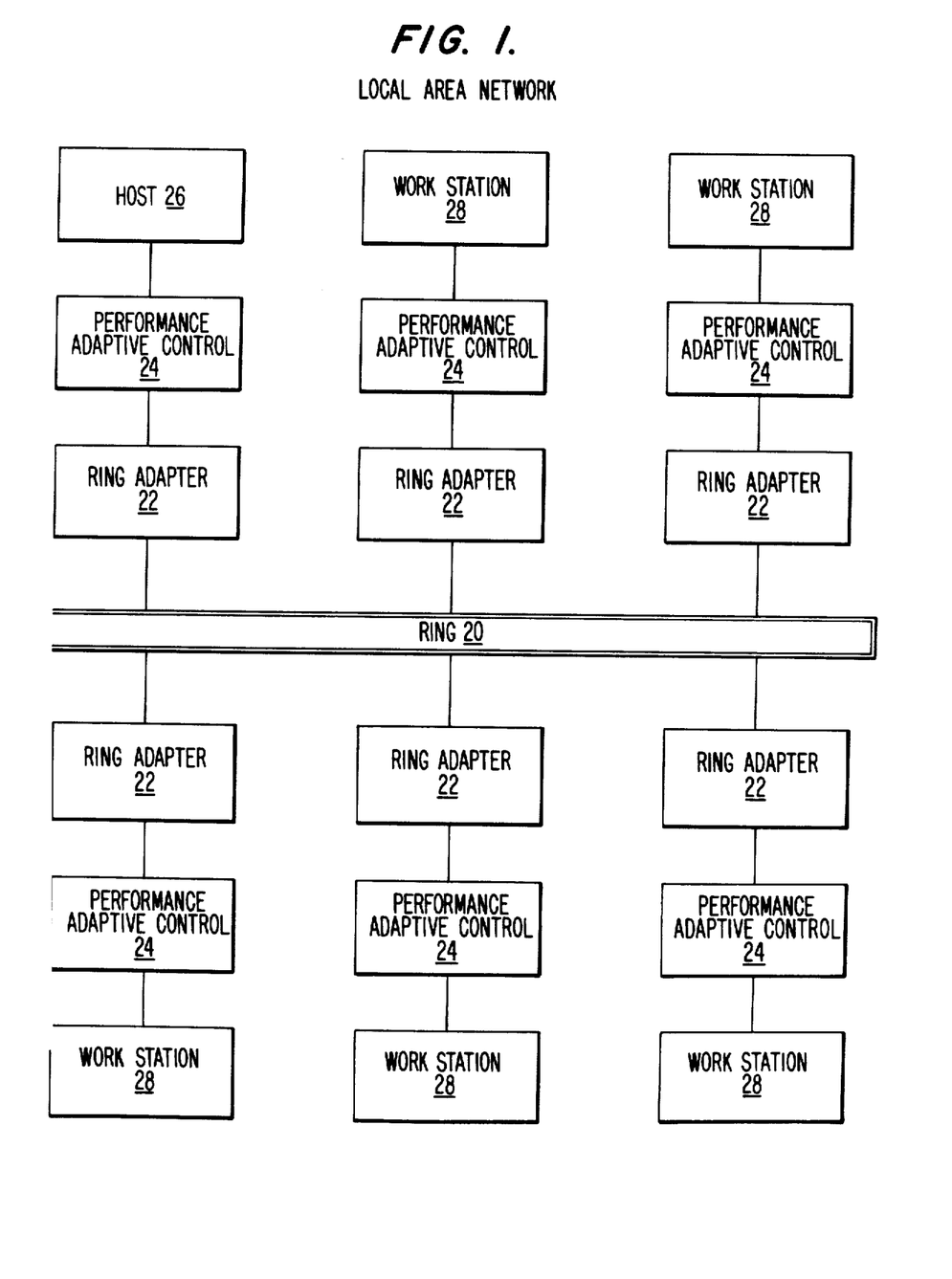
FIG. 1 is an architectural diagram of a ring topology for a local area network.
Figure 2:
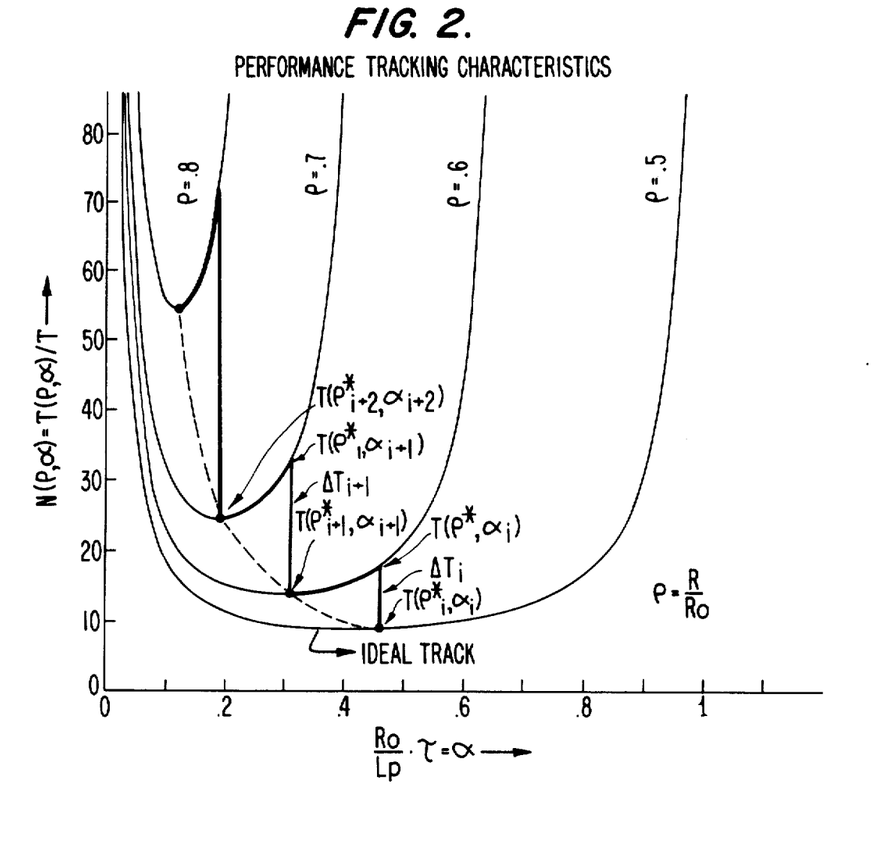
FIG. 2 is a graph illustrating the functional relationship between the packet length (Lp) and the flow rate (R) for minimum access delay times T.

In accordance with the invention, each node on the ring 20 of FIG. 1 comprises a ring adapter 22, a performance adaptive control 24 and a utilization device such as a host 26 or a workstation 28. The invention disclosed herein resides in the performance adaptive control 24, the architecture of which is shown in greater detail in FIG. 4. In accordance with the invention, the performance adaptive control 24 will adaptively control the size of the packets of information transmitted by its node through the ring adapter 22 onto the ring 20 in response to the measured information flow rate R on the ring 20. The performance adaptive control 24 will employ a functional relationship based upon the curves shown in FIG. 2, so that packet lengths Lp are chosen by the performance adaptive control 24 so as to have a minimum value for the average access delay time T, corresponding to the measured information flow rate R. The flow diagram of FIG. 5 illustrates the operation of the performance adaptive control 24.

Figure 4:
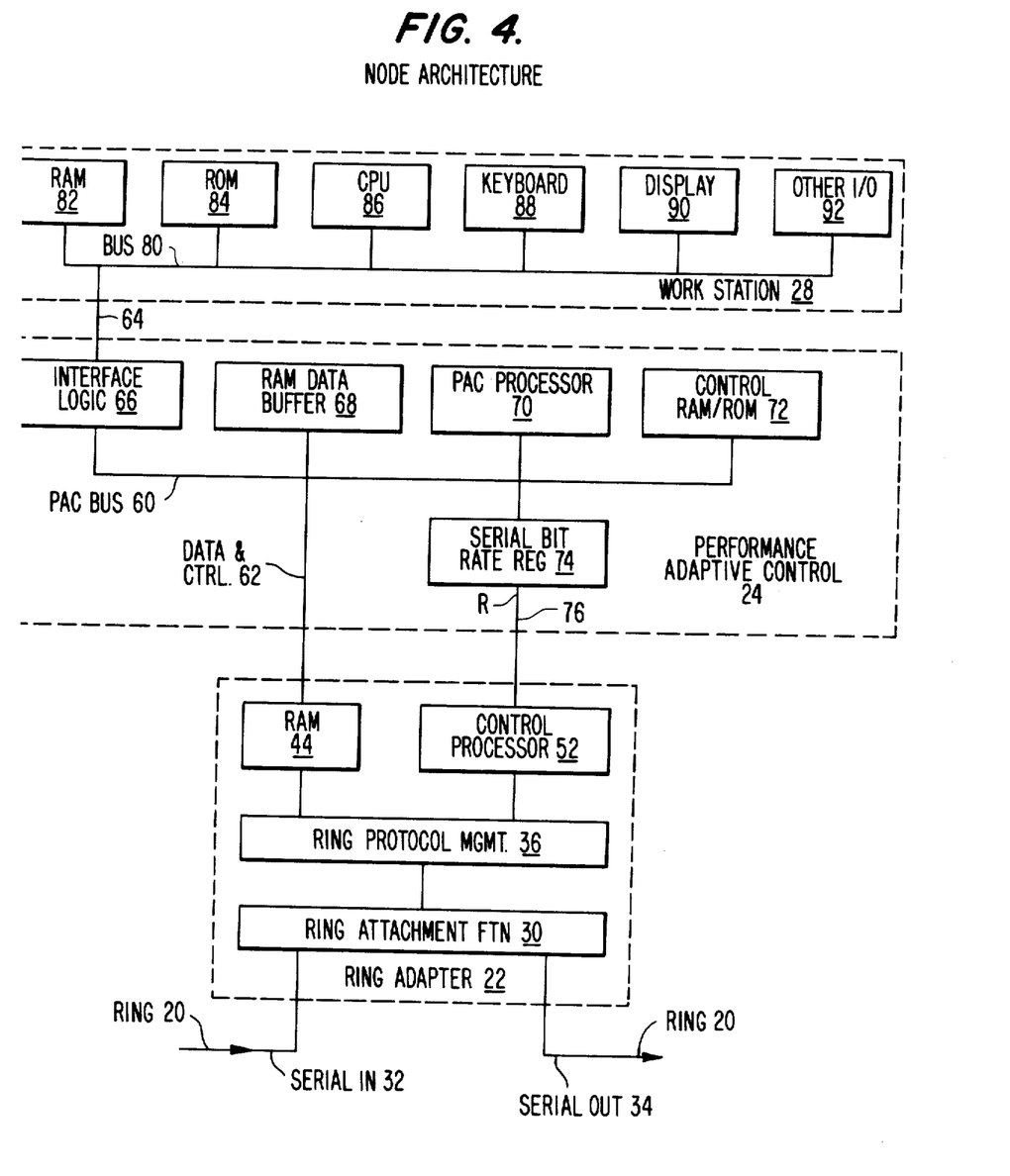
FIG. 4 is a block diagram of the architecture of a node, featuring the performance adaptive control 24.
Figure 5:
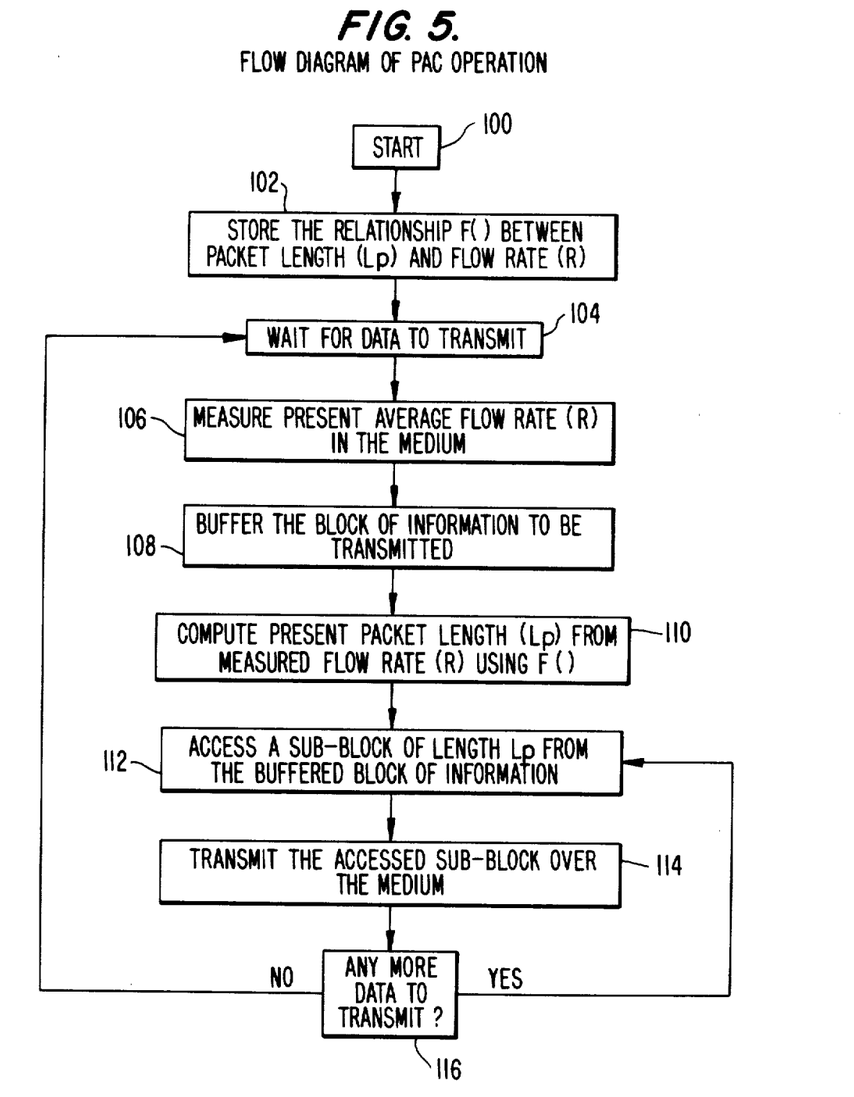
FIG. 5 is a flow diagram illustrating the operation of the performance adaptive control.

The performance adaptive control 24 is connected to the ring 20 by means of the ring adapter 22 as is shown in FIG. 4. The ring attachment function 30 has a serial input 32 connected to the ring 20 and a serial output 34 connected to the ring 20. The ring attachment function 30 is connected to the ring protocol management 36. The control processor 52 is connected to the ring protocol management 36 and to the RAM 44. Control processor 52 is connected by line 76 to the serial bit rate register 74 in the performance adaptive control 24. The RAM 44 of the ring adapter 22 is connected by line 62 to the PAC bus 60 of the performance adaptive control 24. The ring adapter 22 is described in U.S. Pat. No. 4,507,777 to Tucker, et al., assigned to the IBM Corporation. The ring adapter allows a node to accept and dispatch data on the ring 20 using the token ring multiple access protocol. The ring attachment function 30 performs electrical signal conversion on data including modulation and demodulation, and it extracts the timing signal from the serial ring data and uses the timing signal for synchronizing the data onto the serial ring output line 34. The ring attachment function 30 includes the transmitters and receivers which transmit and receive information from the ring 20. The ring protocol management 36 performs bit and byte level functions which include encoding and decoding data, handling token protocols, generating and detecting delimiters, generating and checking cyclic redundancy check decoding addresses, etc. When the node is not in the transmission sequence, the ring protocol management 36 repeats the serial receive data input on line 32 as serial transmit data output on line 34 to the ring 20. When given a formatted message frame in the RAM 44 and the command to transmit the ring protocol management 36 monitors the ring 20 for proper token sequence indicating that it has the permission to transmit. After transmission of a data frame, the ring protocol management 36 will then receive the transmitted packet after it has made its circuit around the ring, and it will strip the frame from the ring and replace the token back onto the ring 20.

Figure 3:
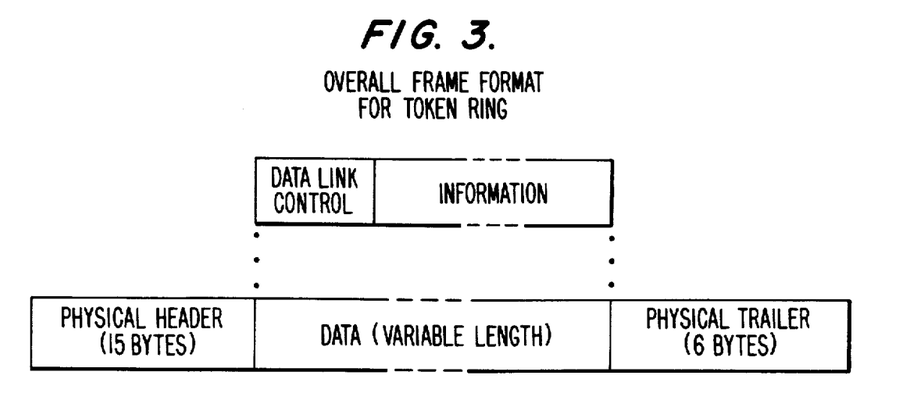
FIG. 3 illustrates the format for a token ring frame.

In accordance with the invention, the control processor 52 in the ring adapter 22 can be programmed to provide the present, measured serial bit rate (R) for the information traffic flowing on the ring 20 and it can periodically provide the value R over the line 76 to the serial bit rate register 74 in the performance adaptive control 24. The format for token ring multiple access protocol is shown in FIG. 3, wherein it is seen that the overall frame format includes a physical header of 15 bytes followed by the data field which has a variable length, which in turn is followed by the physical trailer of six bytes. The variable length data field can include data link control information for higher level control functions in addition to the information data traffic. The control processor 52 in the ring adapter 22 constructs the message frames represented by FIG. 3 in the RAM 44 and causes the ring protocol management 36 to transmit them via the ring attachment function 30 over the ring 20 when it issues a transmit control command. The RAM 44 in the ring adaptor 22 will receive variable length data from the performance adaptive control 24 over the line 62 which is connected to the performance adaptive control (PAC) bus 60. This will be information which is destined for transmission out from the node onto the ring 20 over the serial out line 34. Information that is received from the ring 20 over the serial in line 32 will be passed through the RAM 44 and over the line 62 to the PAC bus 60 in the performance adaptive control 24.

The performance adaptive control 24 is connected between the ring adaptor 22 and the workstation 28 as is shown in FIG. 4. In accordance with the invention, the performance adaptive control 24 will adaptively control the packet length Lp by controlling the size of data sub-blocks passed over the line 62 to the ring adapter 22 which will form the variable length data field in the overall frame format of FIG. 3. The performance adaptive control 24 includes the control storage 72 which can be either a writable random access memory (RAM) and/or a read only memory. In the preferred embodiment, both a RAM and a ROM comprise the control storage 72, and they share the same address space. The control storage 72 stores program instructions which represent the functional relationship between the packet length LP for the packets and the information flow rate R in the ring 20 corresponding to the minimum value of the average delay T for a node to gain access to the ring 20. This functional relationship is represented by the characteristic curves of FIG. 2. The form of the functional relationship stored in the control storage 72 can be an arithmetic expression which relates the packet length to the information flow rate. Alternately, the form of the functional relationship stored in the control storage 72 can be a table of corresponding values relating the packet length to the information flow rate. The control storage 72 is connected to the PAC bus 60 as shown in FIG. 4.

The performance adaptive control 24 also includes the serial bit rate (R) register 74 which receives the value for R over line 76 from the ring adapter 22 and buffers it for access over the PAC bus 60. The performance adaptive control 24 also includes the RAM data buffer 68 which is connected through the PAC bus 60 to the line 62 from the ring adapter 22. The RAM data buffer 68 is also connected over the PAC bus 60 to the interface logic 66 which, in turn, is connected by line 64 to the input/output (I/O) bus 80 of the workstation 28. The RAM data buffer 68 temporarily stores blocks of information from the workstation 28 prior to providing sub-blocks of the buffered block of information to the RAM 44 in the ring adapter 22 for transmission on the ring 20.

The performance adaptive control 24 further includes the PAC processor 70 which is connected to the PAC bus 60. The processor 70 can be a stored program microprocessor such as a Motorola 68000 microprocessor. It sequentially accesses and executes instructions stored in the control storage 72 to carry out the various operations described herein for the performance adaptive control 24. In accordance with the invention, the processor 70 will access the present measured information flow rate R from the register 74 and it will execute the program instructions stored in the control storage 72 so as to operate on the measured value R to compute a resultant packet length Lp. Further in response to the execution of instructions from the control storage 72, the processor 70 will access a sub-block of the block of information in the RAM data buffer 68 having a length equal to the computed length Lp. This sub-block of length Lp will be transferred over line 62 to the RAM 44 and it will form the variable length data field for the overall frame format shown in FIG. 3. Then, the control processor 52 in the ring adapter 22 will add to the sub-block of length Lp, the 15 byte physical header and the six byte physical trailer, and the completed frame will be output by the ring adapter 22 onto the ring 20 over the serial outline 34.

The workstation 28 can be a standalone data processor such as an IBM Personal Computer. The workstation 28 includes the I/O bus to which is connected the RAM 82, ROM 84, the central processing unit (CPU) 86, the keyboard 88, the display 90 and other I/O devices 92. The performance adaptive control 24 and the ring adapter 22 can be physically embodied on an adapter card which physically plugs into one of the adapter slots on the I/O bus 80 of the IBM Personal Computer. The interface logic 66 can output interrupt signals to the workstation 28 and can operate in the manner described in thé allowed U.S. patent application by D. J. Bradley, et al. entitled "System for Managing a Plurality of Shared Interrupt Handlers in a Linked-List Data Structure," Ser. No. 770,541, allowed Sept. 4, 1987, assigned to the IBM Corporation.

The operation of the invention can be further understood with reference to the flow diagram of the performance adaptive control 24 shown in FIG. 5. Step 100 is a starting point followed by step 102 where the functional relationship F between the packet length Lp and the flow rate R is stored in the control storage 72. This can occur at the time of manufacture of the ROM portion of the control storage 72. Alternately, this can occur by loading the RAM portion of the control storage 72 at initial program load time. Then follows step 104 where the performance adaptive control 24 will await data from the workstation 28 to be transmitted over the ring 20. Step 106 follows where the ring adapter 22 provides the measured value R over the line 76, representing the present average flow rate of information in the ring 20. Step 108 follows where a block of the information to be transmitted by the node is received from the workstation 28 and is temporarily stored in the buffer 68. Step 110 follows where the PAC processor 70 computes the present packet length Lp from the measured flow rate R using the function F. Step 112 follows where the processor 70 accesses a sub-block of data having a length Lp from the buffered block of information in the RAM data buffer 68. Step 114 follows where the sub-block of information is transferred over the line 62 to the ring adapter 22 for transmission over the ring 20. Step 116 follows which questions whether there are any more sub-blocks of data in the buffer 68 which must be transmitted. If the answer is yes, then control passes to step 112 and additional sub-blocks are accessed from the buffer 68 for transmission on the ring 20. If the answer in step 116 is no, then control passes to step 104, where the performance adaptive control 24 waits for another block of information from the workstation 28 to be transmitted over the ring 20.

Figure 6:
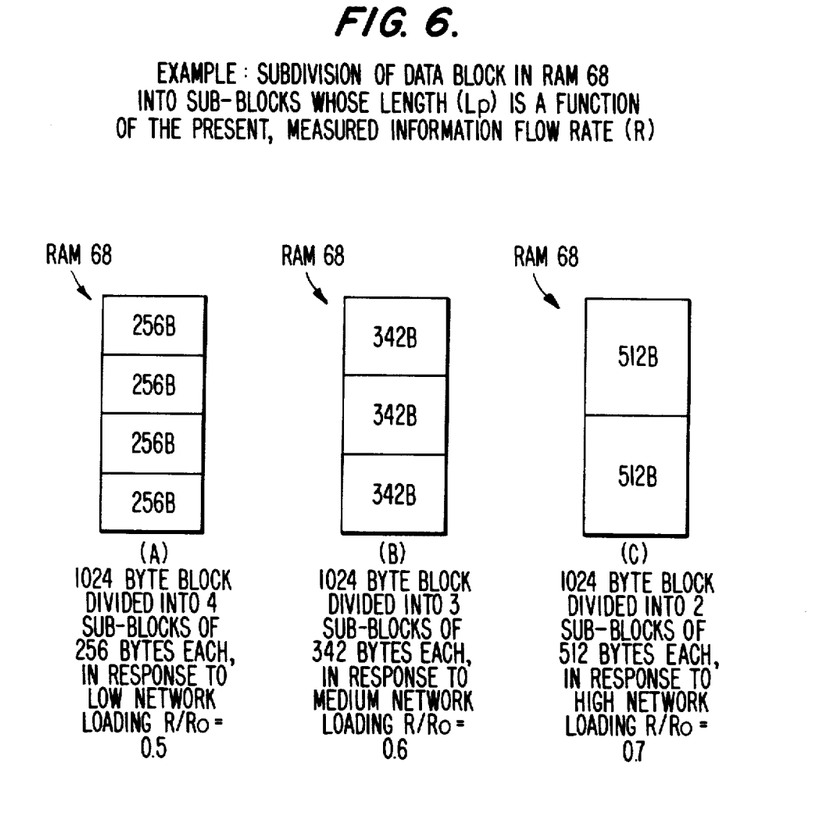
FIG. 6 is an example of the subdivision of a data block in the RAM 68 of the performance adaptive control 24, into sub-blocks whose lengths (Lp) are a function of the present, measured information flow rate (R).

FIG. 6 shows an example of the subdivision of a data block in the RAM 68 into sub-blocks whose length Lp is a function of the present, measured information flow rate R. In part A of FIG. 6, the RAM 68 stores 1024 byte block. In response to a measured low network loading, corresponding to a duty factor of 0.5, the processor 70, in accordance with the invention, will divide the data block in the RAM 68 into four sub-blocks of 256 bytes each. In part B of FIG. 6, as a second example, in response to a measured medium network loading having a duty factor of 0.6, the processor 70 will divide the data block in the RAM 68 into three sub-blocks of approximately 342 bytes each. In part C of FIG. 6, in a third example, in response to a measured high network loading having a duty factor of 0.7, the processor 70 will divide the data block in the RAM 68 into two sub-blocks of 512 bytes each.

DETAILED DESCRIPTION OF THE OPERATION OF THE INVENTION

Figure 7:
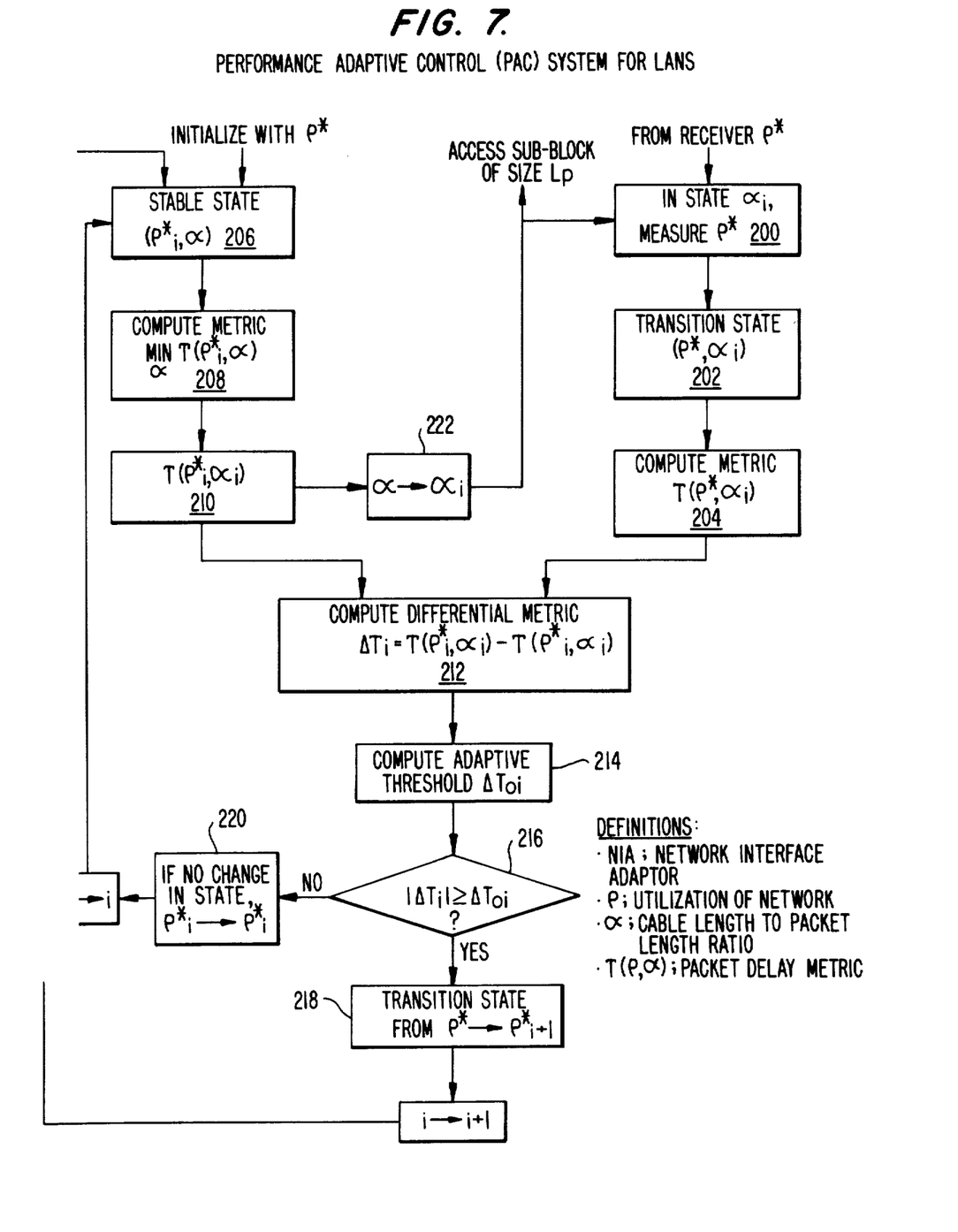
FIG. 7 is a more detailed flow diagram of the performance adaptive control.

The operation of the invention can best be described by referring to the generic performance characteristic shown in FIG. 2 and the flow chart in FIG. 7. The invention is based upon the optimal performance characteristics shown in FIG. 2 which were discovered by the inventor. These functions characterize local area network (LAN) media access protocols such as carrier sense multiple access/collision detection (CSMA/CD), token ring multiple access (TRMA), virtual token multiple access (VTMA) and many others. The performance characteristic N $(\rho,\alpha)$ is the packet delay metric T $(\rho,\alpha)$ normalized with respect to the electrical cable length, $\tau$ as shown in FIG. 2. The parameter $\rho$ is the well-known bandwidth utilization efficiency which is the ratio of cable traffic R (BPS) and cable capacity Ro (BPS) while the parameter $\alpha$ is the ratio of cable length $\tau$ and packet length Lp/Ro where Lp is the packet size in bits. Since the cable length $\tau$ depends on network geometry we can assume that it is fixed. Hence, N $(\rho,\alpha)$ in FIG. 2 is directly proportional to the packet delay T $(\rho,\alpha)$. Also note that as the network utilization increases the system design parameter $\alpha$ must be decreased (i.e., packet size increased) for the network operating point to move to the optimum stable region shown. The invention although applicable to all values of $\rho$, could be of particular interest in the high utilization region (i.e. $0.7 \leq \rho \leq 0.9$) where the stability region is very narrow and where a small change in load could cause unstable network operation. Although the characteristics shown in FIG. 2 assume that the traffic is generated by a homogenous set of terminals, the "cusp-like" shape of the characteristics will be there even then the LAN traffic is non-homogenous. For a given network load, the performance of a LAN for homogenous traffic is an upperbound on any other mixture of traffic. Hence, the invention will be applicable to the case where file server traffic is mixed in with homogenous traffic. For each value of $\rho$, the invention will always attempt to operate in the stable region and at the highest packet rate, $\lambda$. The packet rate $\lambda$ is given by the mathematical expression:

$$\lambda = \frac{\rho\alpha}{\tau}. \tag{1}$$

As we move the optimum operating point from a high utilization to a lower value, the packet rate will increase. Moving the operating point in the opposite direction will decrease the packet rate. A LAN is a packet switched network and in a packet switched network, the objective is to transmit as high a packet rate as the current state of the network will permit. The only reason for decreasing the packet rate as the network load increases is to prevent the network from overloading which is the object of the invention.

We refer to FIG. 2 to show how the invention enables the network to adapt to changes in load. Assume that the network initially is in the optimum stable state $(\rho^*i=0.5;\ \alpha i=0.46)$. The packet delay is $T(\rho^*i,\alpha i)=10\tau$. The traffic on the network $\rho^*$ is *monitored* continuously by the invention as is the metric $T(\rho^*,\alpha i)$. Assume that the traffic load has transitioned to the new state $\rho^*=0.6$ and that the metric in the transition state $\alpha i$ is $T(\rho^*,\alpha i)=18\tau$. The differential metric $\Delta Ti$ is, $$\Delta Ti = 18\tau - 10\tau = 8\tau. \tag{2}$$

Assume now that the change $\Delta Ti$ is sufficient for the invention to initiate the adaptive process. The traffic load is now $\rho^*i+1=0.6$. For this value of load, the invention computes the value of $\alpha$ for the new stable state for which the delay metric $T(\rho^*i+1,\alpha)$ is a minimum, that is $\alpha=\alpha i+1=0.3$. A control signal is now transmitted by the invention to the network interface adapter at the node where the measurement takes place to decrease $\alpha$ from $\alpha i = 0.46$ to $\alpha = 0.3$. Each node in the LAN uses the same adaptive control method and hence transitions to the same stable state resulting in distributed monitoring and control. The parameter $\alpha$ is related to the packet size Lp by the following equation:

$$Lp = \frac{Ro\,\tau}{\alpha} \qquad (3)$$

$$\frac{Lp(i+1)}{Lp(i)} = \frac{\alpha i}{\alpha i + 1} \qquad (4)$$

$$\frac{Lp(i+1)}{Lp(i)} = 1.5. \qquad (5)$$

Hence, to transition to the new stable state at the new operating point, the invention causes the network packet size to increase by 50%. For example if the packet size in Eq. (5) $Lp(i) = 128$ bytes, then the new packet size, $Lp(i+1) = 192$ bytes. If the packet load $\rho^*$ increases, the adaptive process will transition upward and to the left, and if the load decreases, the adaptive process will transition downward and to the right.

The network packet rates in the initial state $(\rho^*i,\alpha i)$ and in the final state $(\rho^*i+1,\alpha i+1)$ are, from Eq. (1), $$\lambda i = \frac{\rho i \alpha i}{\tau} = \frac{0.5 \times 0.46}{\tau} = \frac{0.23}{\tau} \qquad (6a)$$

$$\lambda i + 1 = \frac{\rho i + 1 \cdot \alpha i + 1}{\tau} = \frac{0.6 \times 0.3}{\tau} = \frac{0.18}{\tau}. \qquad (6b)$$

Hence, the percentage decrease in packet rate carried out by the invention when moving to the higher state is, $$\frac{\lambda i + 1}{\lambda i} = 78\% \qquad (7)$$

A 22% decrease in packet rate is necessary to allow the network to transition from a near unstable operating point to a stable one.

To show the process even more vividly let us examine a transition to a higher utilization from $(\rho^*i+2=0.7; \alpha i+2=0.2)$ to $(\rho^*i+3=0.8,\alpha i+3=0.1)$, (FIG. 2). For this case, from Eq. (4), we have, $$\frac{Lp(i+3)}{Lp(i+2)} = \frac{\alpha i + 2}{\alpha i + 3} = \frac{0.2}{0.1} = 2. \qquad (8)$$

This requires doubling the packet size. The new packet size will reduce the packet rate by, $$\frac{\lambda i + 3}{\lambda i + 2} = \frac{\rho i + 3 \cdot \alpha i + 3}{\rho i + 2 \cdot \alpha i + 2} = \frac{0.8 \times 0.1}{0.7 \times 0.2} = 0.57 \qquad (9)$$

In the transition process the packet rate must be reduced to 57% of its previous value. Of course, the packet rate increases when the network transition is downward.

FIG. 7 is the flow chart which we will use to describe the adaptive process of the invention in more detail.

The measured state $\rho^*$ is shown in steps 200, 202 and 204 to the right and the transitioning process from one state to the next is shown in steps 206, 208 and 210 to the left. The ring adapter 22 at a node measures in step 200 the normalized traffic $\rho^* = R^*/Ro$ (where $R^*$ is the measured bit rate on the ring 20) when the network is in state $(\rho^*,\alpha i)$ operating at some packet size Lp(i). The processor 70 calculates the packet delay $T(\rho^*,\alpha i)$ in step 204 and then the differential metric $\Delta Ti$ as shown in step 212. One component of the differential metric, $T(\rho^*i,\alpha i)$ is provided by the computer function that calculates the current stable state (step 204 at the left in the flow chart of FIG. 7). The absolute value of the differential metric ($\Delta Ti$) is compared in step 216 to a threshold value $\Delta Toi$ whose value in step 214 is a function of the current stable state $(\rho^*i,\alpha i)$. If $|\Delta Ti| \geq \Delta Toi$, the network must adapt in step 218 to a new transition state $(\rho i+1,\alpha)$ where $\rho^* = \rho^*i+1$. Otherwise, no changes to the network are made and the measurement process $\rho^*$ continues in step 220. In the invention, the threshold parameter $\Delta Toi$ is a function of the current stable state and will change as the process transition to a new state. FIG. 2 shows why the threshold is adaptive as well. Note, that as the network transitions to a higher utilization, the change $\Delta Ti$ is larger and more rapid for the same differential in utilization, say, $\Delta \rho = 0.1$. By opening up a wider window $\Delta Tio$ which will include larger variations in $\Delta Ti$, we can expect to detect a transition more quickly and perhaps without increasing the integration (smoothing) time. Adapting the threshold as a function of the state $(\rho^*i,\alpha i)$ is an important part of the invention.

In the transition state $(\rho^*1+1,\alpha)$ the processor 70 finds the value of $\alpha$ for which the metric is a minimum, i.e., $\alpha = \alpha i + 1$. This value of $\alpha$ is then fed back in step 222 to the new measured state $(\rho^*,\alpha i+1)$. Also the new metric $T(\rho^*i+1,\alpha i+1)$ is now the new reference for comparing the current metric $T(\rho^*,\alpha i+1)$ with the minimum value. The value $\alpha = \alpha i + 1$ is also used by the processor 70 to control the packet size from Lp(i) to Lp(i+1), which is accessed from RAM 68. With this new packet size the network will transition gradually to the optimum operating point.

Figure 8:
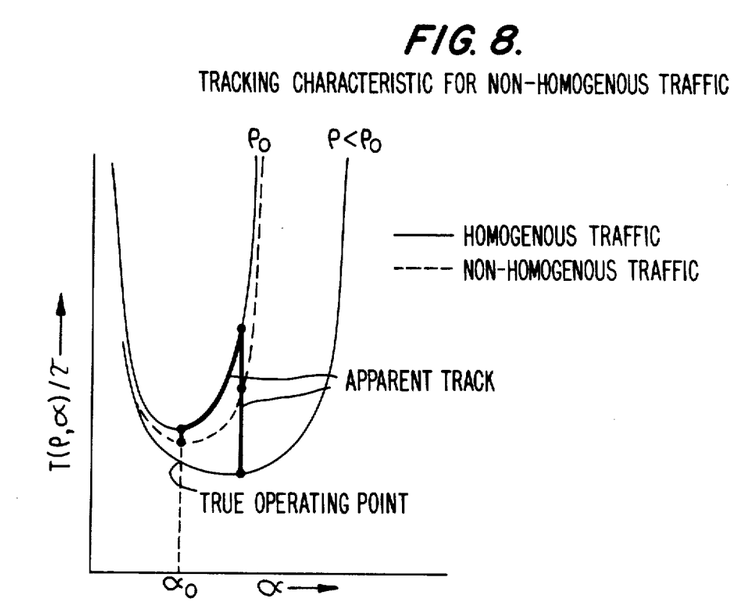
FIG. 8 is a graph illustrating the tracking characteristic for non-homogenous traffic.

The invention is applicable to the important case where the traffic on a LAN is not homogenous, that is when a change in traffic can be caused by a file transfer. The performance characteristics for homogenous traffic will provide an upper bound for the non-homogenous traffic case for any value of network utilization $\rho$, as shown in FIG. 8. One can see in FIG. 8 that the adaptive algorithm which assumes homogenous traffic will always function properly for the non-homogenous case and will still be very close to the optimum. The apparent "track" shown in FIG. 8 is computed using the same method as before (see FIG. 7). However, the true operating point for non-homogenous traffic will be somewhat below that shown, but for all practical purposes at the true minimum value of $\alpha$.

Although we have described a distributed adaptive control method, the invention can just as easily be used with centralized control. In centralized control a terminal ready to transfer a file lets the network manager know of this and also specifies the file size and transfer rate. The network manager than uses the method shown in FIG. 7 to find the value $\alpha$ which minimizes $T(\rho^*i,\alpha i)$ and then sends the packet size control parameter $\alpha i$ to each node. The network management function uses the invention to monitor $T(\rho^*i,\alpha i)$ in order to ensure that the network now functions as required. The advantage of centralized over adaptive control is that new traffic is not allowed on the network without permission until the network parameter $\alpha$ is adjusted to handle the load. The network manager, however, uses the method in FIG. 7 to monitor traffic and sense when the load on the network decreases. The network manager then transmits a larger control value of α which will reduce the packet size to a smaller value and in turn permit the packet rate transmitted by each node to increase, Eq. (1). Of course, distributed adaptive control has the advantage that a centralized monitor and control function is not needed which leads to a much more reliable network.

A combination of adaptive and centralized control can also be implemented with centralized control used only to allow for the very rapid transfer of extremely large files. For this special application, the network manager could use a priority control algorithm which allows high priority users to remain active during the file transfer.

The invention can also be used in the design of a LAN which will not overload as long as $\rho^* \leq \rho o$ i.e., a worst case design. The value of α is selected so that the network will operate at the optimum value when the load is $\rho o$. This value, $\alpha = \alpha o$ is not changed even when $\rho^* < \rho o$. The pair $(\rho o, \alpha o)$ also define the maximum value of packet rate. At all values of utilization $\rho^* < \rho o$, the packet rate will be less than $$\lambda < \frac{\rho o \; \alpha o}{\tau}. \tag{10}$$

This is the simplest approach for guarding against network overload at the expense of always operating at a low packet rate.

The equations which describe the performance tracking characteristic shown in FIG. 2 are:

Carrier Sense Multiple Access with Collision Detection (CSMA/CD):

$$N(\rho,\alpha) = \tag{11}$$

$$T(\rho,\alpha)/\tau = \frac{1}{\alpha}\left[1 + (2e + \tfrac{1}{2})\alpha + \frac{0.5\rho(1 + 13\alpha + 52\alpha^2)}{1 - \rho[1 + (1 + 2e)\alpha]}\right] -$$

$$\frac{2[1 + \rho\alpha(e^{-1} - 3)]\frac{\sinh \rho\alpha}{\rho\alpha}}{e^{-1} F(\rho) - 2 \sinh \rho\alpha};$$

$F(\rho) = e^{-\rho}$, Fixed size packets
$\quad\quad\; = (1 + \rho)^{-1}$, passanian packets Token Ring Multiple Access (TRMA):

$$N(\rho,\alpha) = T(\rho,\alpha)/\tau = \left(2 + \frac{1}{\alpha}\right)\frac{[1 - 0.5\rho(1 + \alpha)]}{1 - \rho(1 + \alpha)}. \tag{12}$$

Virtual Token Multiple Access (VTMA):

$$N(\rho,\alpha) = T(\rho,\alpha)/\tau = \left(\tfrac{1}{2} + \frac{1}{\alpha}\right) + \tag{13}$$

-continued $$\frac{3b + \rho\left[(\tfrac{1}{2} - b) + \frac{\alpha}{2}(1 - b) + \frac{\alpha^2}{6}\right]}{\alpha\left[1 - \rho\left(1 + \frac{\alpha}{2}\right)\right]}.$$

where, $$b = 2\left[\frac{S}{E[Lp]} + \alpha\right];$$

S = Number of Users.

Eq. (11), (12), and (13) all have the same functional form shown in FIG. 2 although the actual numerical values are different. The equations are for three important media access protocols: CSMA/CD, TRMA, and VTMA. The first two protocols have been recommended by the IEEE 802.3 and IEEE 802.5 committee as LAN standards.

The invention goes beyond these specific mathematical models since, it is believed, that all LAN media access protocols will exhibit the same functional form shown in FIG. 2. We can even measure the tracking characteristics empirically, store them in control RAM 72 and then use them in the invention for controlling the performance adaptively just as if we had stored instructions for solving the mathematical equations.

DESCRIPTION OF AN ALTERNATE EMBODIMENT OF THE INVENTION

Figure 9:
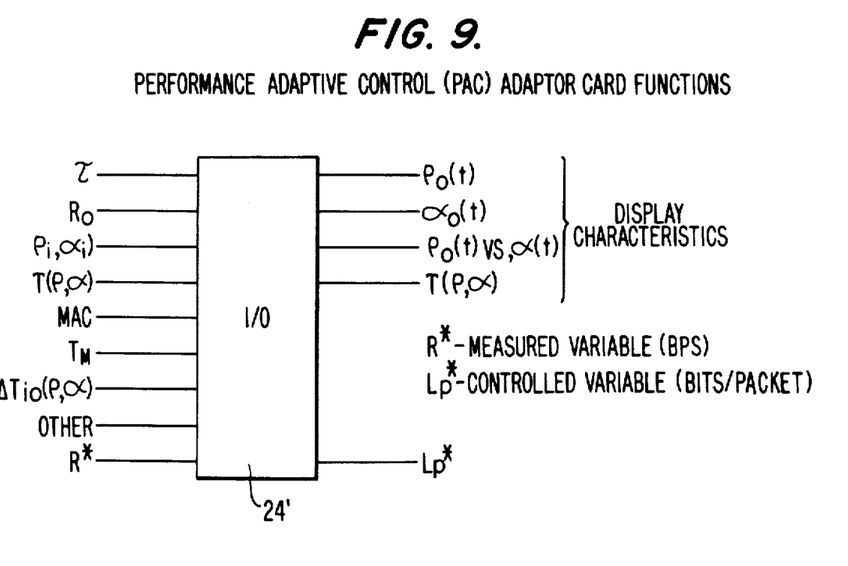
FIG. 9 is a generalized functional representation of an alternate embodiment of the performance adaptive control.

FIG. 9 shows the input and output parameters and functions as well as the measured load variable R* and the controlled packet size variable Lp* for the alternate embodiment PAC 24'. The parameters and functions shown in FIG. 9 are defined in Table I.

Figure 10:
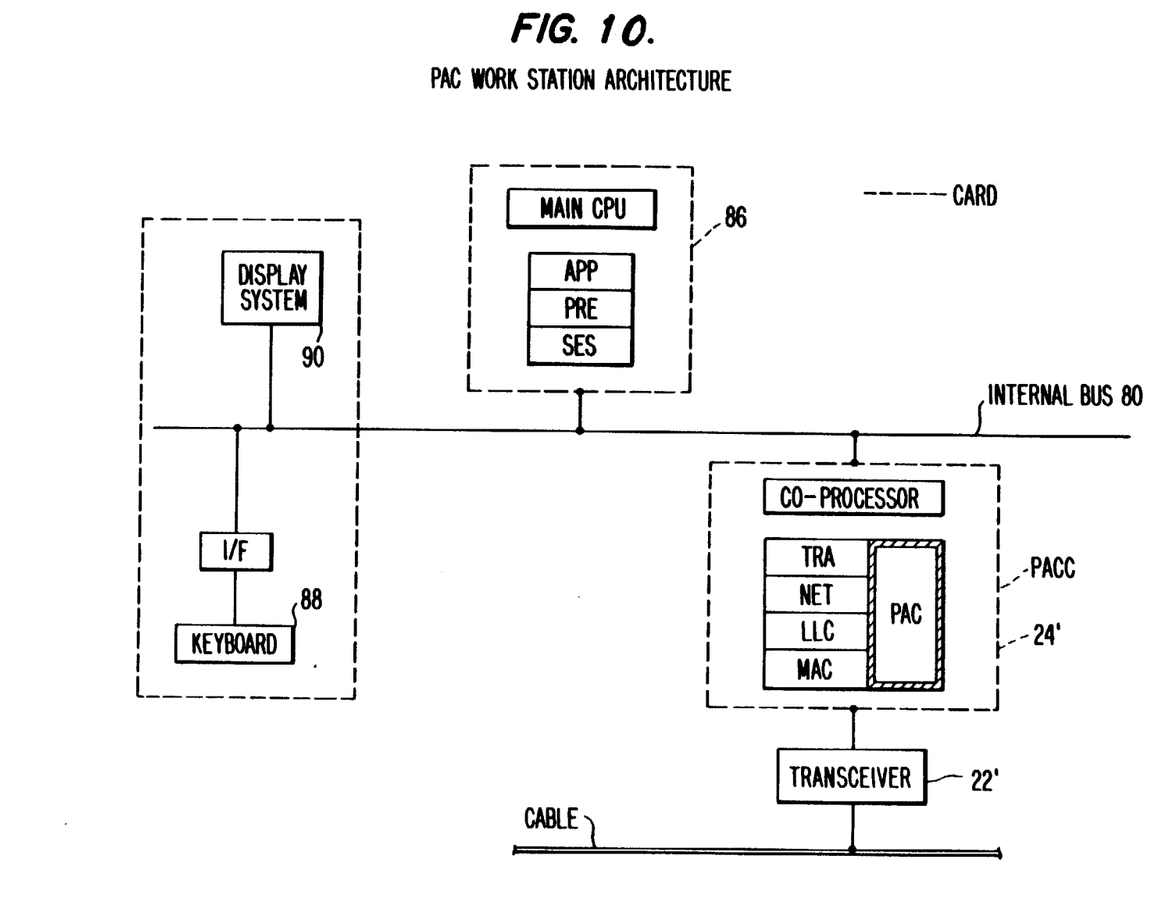
FIG. 10 is a functional block diagram of the alternate embodiment of the performance adaptive control in a workstation.

The architecture for the alternate embodiment of the invention is shown in FIG. 10. The performance adaptive control (PAC) 24' shown represents the invention. PAC 24' can be implemented with the OSI/RM communication protocols shown. PAC 24' measures R* and controls the packet size Lp*, and therefore functions as a network monitor and control function resident in the coprocessor. The conventional workstation function is performed in the main CPU 86 where the higher level communication protocols and the application reside. The other functions include a keyboard 88 for entering the PAC parameters and a display system 90 where the PAC time variant functions can be displayed on a screen, on request. Of course the main functions of the keyboard and display are for using the workstation.

TABLE 1

| | Definition of Parameters |
|---|---|
| | Parameters |
| $\tau$ | Electrical length of cable (sec) |
| Ro | Cable capacity (BPS) |
| $\rho$ | Cable capacity utilization |
| $\alpha$ | Cable length ($\tau$) to packet length (Lp/Ro) ratio |
| $T(\rho,\alpha)$ | Packet delay tracking characteristic (sec) |
| MAC | Media access control protocol |
| $T_M$ | Measurement interval (sec) |
| $\Delta$ Tio | Adaptive threshold (sec) |
| R* | Traffic load measured variable (sec) |
| L*$_p$ | Packet size controlled variable (bits/packet) |
| | Open system Interconnect (OSI) |
| APP | Application Layer |

TABLE 1-continued

| | Definition of Parameters |
|---|---|
| PRE | Presentation Layer |
| SES | Session Layer |
| TRA | Transport Layer |
| NET | Network Layer |
| LLC | Logical Link Control |
| MAC | Media Access Control |
| PAC | Performance Adaptive Control (Invention) |
| I/F | Interface |
| CPU | Central Processor Unit |

The resultant adaptive packet length traffic control apparatus and method maintains network stability in a packet switching local area network under changing traffic load in an optimal manner by controlling the packet size transmitted. The traffic level is therefore maintained at all nodes even when the network traffic increases. The operation of the invention is independent of the nature of the traffic, that is it can be digitized voice, interactive data, the transfer of data files, or other diverse types of data communications applications. The invention is also independent of the local area network protocol employed and can be applied to CSMA/CD, token ring, token bus, virtual token, and other protocols. The invention offers a traffic control mechanism for providing network flow control without forcing the data terminals connected to the nodes to either slow down or speed up their operations.

Although specific embodiments of the invention have been disclosed, it will be understood by those having skill in the art that minor changes can be made to the form and the details of the disclosed invention without departing from the spirit and the scope of the invention.

What is claimed is:

1. In a communications network having a plurality of nodes connected to a multiple access communications medium with each node executing an access method to obtain exclusive access to the medium after which the node gaining access transmits a packet of information over the medium, an adaptive packet length apparatus for minimizing an average delay for each node gaining access to the medium, comprising:

storage means for storing program instructions representing a functional relationship between a packet length for said packet and an information flow rate in said medium, said functional relationship being that said packet length increases as said information flow rate increases in order to maintain a minimum value of an average delay for a node to gain access to said medium;

measurement means coupled to said medium for measuring an average information flow rate in said medium;

buffer means at each node coupled to a source of information to be transmitted and coupled to said medium for temporarily storing a block of said information from said source prior to transmission over said medium;

computing means connected to said storage means, to said measurement means and to said buffer means, for receiving a measured value of said average information flow rate from said measurement means, executing said program instructions from said storage means to operate on said measured value to compute a resultant packet length value, and accessing a sub-block of said block of information in said buffer means, having a length approximate to said resultant packet length value;

said buffer means outputting said accessed sub-block of information for transmission over said medium.

2. The apparatus of claim 1, wherein each node of said network includes said storage means, said measurement means and said computing means for distributed adaptive control of the lengths of the packets of information transmitted from each respective node.

3. The apparatus of claim 1, wherein the form of said functional relationship stored in said storage means is an arithmetic expression relating packet length and information flow rate.

4. The apparatus of claim 1, wherein the form of said functional relationship stored in said storage means is a table of corresponding values relating packet length and information flow rate.

5. The apparatus of claim 1, wherein said functional relationship stored in said storage means relates increases in the packet length to increases in the measured value of the information flow rate in order to minimize the average delay for a node to gain access to said medium.

6. The apparatus of claim 1, wherein said storage means is a read only memory.

7. The apparatus of claim 1, wherein said storage means is a writable random access memory.

8. The apparatus of claim 1, wherein said network is a carrier sense multiple access with collision detection local area network.

9. The apparatus of claim 1, wherein said network is a token ring multiple access local area network.

10. In a communications network having a plurality of nodes connected to a multiple access communications medium with each node executing an access method to obtain exclusive access to the medium after which the node gaining access transmits a packet of information over the medium, an adaptive packet length control method for minimizing an average delay for each node gaining access to the medium, comprising the steps of:

storing a relationship between a packet length for said packet and an information flow rate in said medium, said functional relationship being that said packet length increases as said information flow rate increases in order to maintain a minimum value of an average delay for a node to gain access to said medium;

measuring an average information flow rate in said medium;

buffering a block of said information received from an information source, prior to transmission thereof over said medium;

computing a resultant packet length value from said measured information flow rate;

accessing a sub-block of said block of buffered information having a length approximate to said resultant packet length value;

outputting said accessed sub-block of information for outputting over said medium;

repeating said steps of accessing and transmitting a sub-block until said entire buffered block of information has been transmitted over said medium.

* * * * *